United States Patent
Myers, Jr. et al.

(10) Patent No.: US 6,196,248 B1
(45) Date of Patent: Mar. 6, 2001

(54) FUEL FLOW CONTROL SYSTEM

(75) Inventors: William J. Myers, Jr., West Chester; Frederick E. Van Alen, Cincinnati, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/366,510

(22) Filed: Aug. 3, 1999

(51) Int. Cl.[7] .................................................. F16K 11/20
(52) U.S. Cl. .................... 137/12; 137/486; 137/487.5; 137/883; 137/885
(58) Field of Search ........................ 137/12, 486, 487.5, 137/883, 885

(56) References Cited

U.S. PATENT DOCUMENTS

| | | |
|---|---|---|
| 5,048,394 | 9/1991 | McLevige et al. . |
| 5,054,369 | 10/1991 | Wardle et al. . |
| 5,081,903 | 1/1992 | Wardle et al. . |
| 5,088,383 | 2/1992 | Wardle et al. . |
| 5,090,194 | 2/1992 | Richards et al. . |
| 5,546,988 | * 8/1996 | Perkey et al. ............... 137/596.15 X |
| 5,551,478 | * 9/1996 | Veilleux et al. ............... 137/596.15 |
| 5,570,718 | * 11/1996 | Smith et al. ................... 137/596.16 |
| 5,996,464 | * 12/1999 | McLevige et al. .......... 137/596.17 X |

* cited by examiner

Primary Examiner—Gerald A. Michalsky
(74) Attorney, Agent, or Firm—Andrew C. Hess; Nathan D. Herkamp

(57) ABSTRACT

An exemplary embodiment of the invention is directed to a fuel flow control system for use with a fuel distribution system having a plurality of zones each including a servo-valve. The fuel flow control system includes a fluidic multiplexer having a plurality of pressure ports and a plurality of servoflow ports. The fluidic multiplexer sequentially receives pressure from each zone and sequentially provides servo fluid to each servovalve. A pressure sensor is fluidly coupled to the pressure ports and generates a pressure signal for each zone. A controller receives the pressure signal and generates a control signal. A driver receives the control signal and increases or decreases flow through the servoflow ports in response to the control signal.

8 Claims, 2 Drawing Sheets

FUEL FLOW CONTROL SYSTEM

STATEMENT REGARDING FEDERALLY SPONSORED RESEARCH AND DEVELOPMENT

The U.S. Government may have certain rights in this invention pursuant to contract number NAS3-27720.

BACKGROUND OF THE INVENTION

The invention relates generally to a fuel flow control system and in particular to a fuel flow control system which uses multiplexing to sense pressure in a fuel distribution system and to control servoflow to multiple valves. Conventional systems use a manifold to distribute fuel to a plurality of zones. In order to control fuel flow at each zone, individual fuel metering devices are used at the inlet to each zone. Each individual fuel metering device includes an electro-hydraulic servovalve, a metering valve, a pressure drop regulator, and a throttling or bypass valve. Using such fuel metering devices at each zone increases the cost, complexity and weight of the system. Accordingly, there is a perceived need in the art for an improved fuel control system.

BRIEF SUMMARY OF THE INVENTION

An exemplary embodiment of the invention is directed to a fuel flow control system for use with a fuel distribution system having a plurality of zones each including a servovalve. The fuel flow control system includes a fluidic multiplexer having a plurality of pressure ports and a plurality of servoflow ports. The fluidic multiplexer sequentially receives pressure from each zone and sequentially provides servo fluid to each servovalve. A pressure sensor is fluidly coupled to the pressure ports and generates a pressure signal for each zone. A controller receives the pressure signal and generates a control signal. A driver receives the control signal and increases or decreases flow through the servoflow ports in response to the control signal.

DETAILED DESCRIPTION OF THE INVENTION

Figure 1:
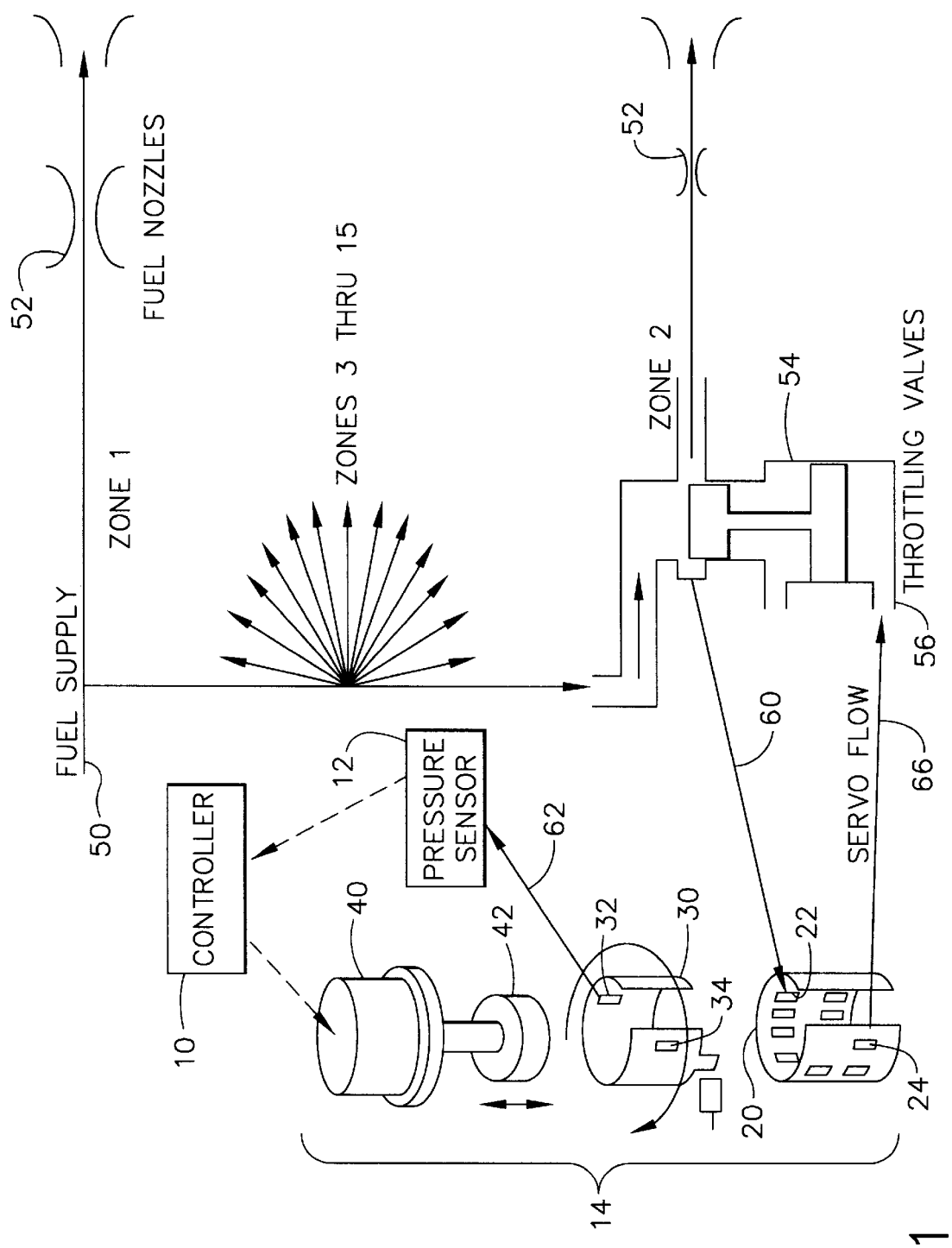
FIG. 1 depicts a fuel flow control system in an exemplary embodiment.

FIG. 1 depicts a fuel control system in an exemplary embodiment of the invention. The fuel control system includes a controller 10, a pressure sensor 12 and a fluidic multiplexer 14. The fluidic multiplexer 14 includes a first multiplexer body 20 having first pressure ports 22 and first servoflow ports 24. The fluidic multiplexer 14 also includes a second multiplexer body 30 having a second pressure port 32 and a second servoflow port 34. A driver 40 controls a piston 42 which is used to selectively restrict flow through the first and second servoflow ports. The second multiplexer body 30 is located within the first multiplexer body 20. The second multiplexer body 30 rotates relative to the first multiplexer body 20. By this rotation, first pressure ports 22 are sequentially aligned with the second pressure port 32 and first servoflow ports 24 are sequentially aligned with second servoflow port 34. This first and second multiplexer bodies are shown having cylindrical geometries. It is understood that other geometries may be used.

The fuel control system may be used with a fuel distribution system shown in FIG. 1. Fuel is provided by a fuel supply 50 which is distributed (e.g., by a manifold) to fuel nozzles 52 located in a plurality of zones. Each zone includes a throttling valve 54 for controlling the flow of fuel to a fuel nozzle 52. The throttling valves 54 may be implemented using conventional servovalves. A fluidic connection 60 (e.g., a hose) is provided between each first pressure port 22 and the inlet of each zone. A fluidic connection 62 (e.g., a hose) is provided between the second pressure port 32 and the pressure sensor 12. As the second multiplxer body 30 rotates relative to the first multiplexer body 20, pressure from each zone is sequentially provided to pressure sensor 12. The pressure sensor 12 generates and electrical pressure signal which is provided to controller 10 through known techniques (e.g., wires, telemetry, etc.). The controller 10 receives the pressure signal and generates a control signal which is provided to driver 40 through known techniques. The controller 10 may compare the pressure signal to a desired pressure stored in the controller to determine whether to increase or decrease servoflow. The driver 40 alters the position of piston 42 to either increase or decrease servoflow through second servoflow port 34. The second servoflow port 34 is connected to a source of servo fluid. A fluidic connection 66 (e.g., a hose) is provided between each first servoflow port 24 and a servo input 56 on each throttle valve 54.

In operation, the second multiplexer body 30 rotates relative to the first multiplexer body 20 to align the second pressure port 32 with a first pressure port 22 corresponding, for example, to zone 2. When the first pressure port 22 and second pressure port 32 are aligned, a pressure signal indicative of the pressure in zone 2 is generated by pressure sensor 12. Controller 10 receives the pressure signal and determines if any change in servoflow is necessary with respect to zone 2. If so, piston 42 is moved to either increase or decrease the servoflow to zone 2. This alters the position of throttle valve 54 in zone 2 to thereby adjust the pressure in zone 2. Subsequently, the second multiplexer body 30 continues to rotate until the first pressure port 22 corresponding to zone 3 is aligned with second pressure port 32. The throttle valve 54 in zone 3 is adjusted as necessary. Operation continues in this fashion.

Figure 2:
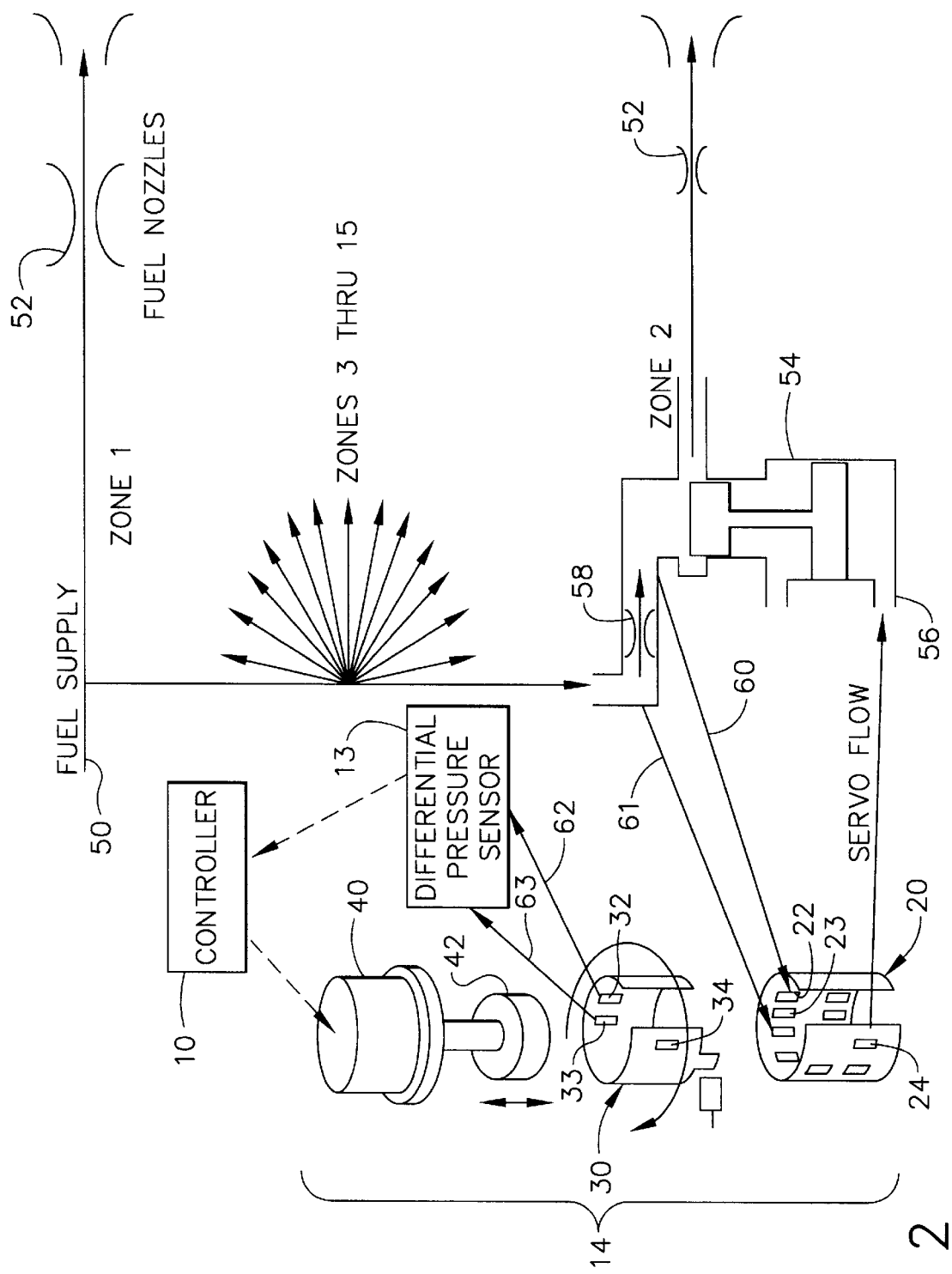
FIG. 2 depicts a fuel flow control system in another exemplary embodiment.

FIG. 2 is a fuel control system in another exemplary embodiment. The fuel control system in FIG. 2 is similar to that of FIG. 1 except that control is based on a pressure differential sensed at each zone. Each zone includes a calibrated orifice 58. One side of orifice 58 is connected to first pressure port 22 by fluidic connection 60. The other side of orifice 58 is connected to further first pressure port 23 by fluidic connection 61. The remaining first pressure ports are similarly coupled to calibrated orifices in other zones. The first pressure ports 22 and 23 are sequentially aligned with second pressure ports 32 and 33 as second multiplexer body 30 rotates relative to first multiplexer body 20. Second pressure ports 32 and 33 are fluidly coupled to a differential pressure sensor 13 by fluidic connections 62 and 63. Accordingly, the differential pressure sensor 13 receives pressure from both sides of the calibrated orifice 58. The differential pressure sensor 13 detects the difference in pressure across the orifice 58 and generates a differential pressure signal. The differential pressure signal is provided to controller 10 which adjusts the position of piston 42 in order to increase or decrease the servoflow through servoflow ports 34 and 24. The controller 10 may compare the differential pressure to a predetermined differential pressure to determine whether to increase or decrease servoflow.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A fuel flow control system for use with a fuel distribution system having a plurality of zones each including a servovalve, the fuel flow control system comprising:
    a fluidic multiplexer having a plurality of pressure ports and a plurality of servoflow ports, said fluidic multiplexer sequentially receiving pressure from each zone and sequentially providing servo fluid to each servovalve;
    a pressure sensor fluidly coupled to said pressure ports, said pressure sensor generating a pressure signal;
    a controller for receiving said pressure signal and generating a control signal; and
    a driver for receiving said control signal and increasing or decreasing flow through said servoflow ports in response to said control signal.

2. The fuel flow control system of claim 1 wherein said fluidic multiplexer comprises:
    a first multiplexer body having a plurality of first pressure ports, each of said first pressure ports fluidly coupled to one of said zones, and having a plurality of first servoflow ports, each of said first servoflow ports fluidly coupled to one of the servovalves; and
    a second multiplexer body having a second pressure port and a second servoflow port, said second mulitplexer body and first multiplexer body movable with respect to each other to sequentially align said first pressure ports and said second pressure port and to sequentially align said first servoflow ports and said second servoflow port.

3. The fuel flow control system of claim 2 wherein:
    said first multiplexer body is stationary and said second multiplexer body moves relative to said first multiplexer body.

4. The fuel flow control system of claim 2 further comprising:
    a calibrated orifice positioned in one of the zones, wherein one of said first pressure ports is fluidly coupled to a first side of said orifice and a further first pressure port is fluidly coupled to a second side of said orifice; and
    said pressure sensor is a differential pressure sensor for detecting the pressure drop across said orifice.

5. The fuel flow control system of claim 2 wherein:
    said first multiplexer body is cylindrical;
    said second multiplexer body is cylindrical; and
    said second multiplexer body is positioned with said first multiplexer body.

6. The fuel flow control system of claim 2 further comprising:
    a piston coupled to said driver, said piston being positioned relative to said first servoflow port to increase or decrease servoflow through said first servoflow port.

7. A method of controlling fuel flow in a fuel distribution system having a plurality of zones each including a servovalve, the method comprising:
    using a fluidic multiplexer to sequentially receive pressure from each zone and sequentially provide servo fluid to each servovalve;
    sequentially sensing a pressure in each zone through said fluidic multiplexer; and
    sequentially controlling servoflow through said fluidic multiplexer to each servovalve in response to said pressure in each zone.

8. The method of claim 7 wherein:
    said pressure is a differential pressure.

* * * * *